United States Patent [19]

Wiklund

[11] Patent Number: 5,292,165

[45] Date of Patent: Mar. 8, 1994

[54] LIFTING HOOK WITH A SAFETY LATCH AND CAPABLE OF BEING PROVIDED WITH AUTOMATIC LOAD RELEASE FUNCTION

[76] Inventor: Henry W. Wiklund, Bäckvägen 1, Arbra S-820 10, Sweden

[21] Appl. No.: 16,046

[22] Filed: Feb. 10, 1993

[30] Foreign Application Priority Data

Feb. 18, 1992 [SE] Sweden ............................ 9200471-2

[51] Int. Cl.⁵ ............................................ B66C 1/36
[52] U.S. Cl. .............................. 294/82.33; 294/82.2
[58] Field of Search ............... 294/82.17, 82.19, 82.2, 294/82.24, 82.31, 82.33; 24/598.7, 599.1, 599.9, 600.1, 601.5

[56] References Cited

U.S. PATENT DOCUMENTS

| | | | |
|---|---|---|---|
| 2,864,644 | 12/1958 | Marryatt | 294/82.31 X |
| 3,173,718 | 3/1965 | Harley | 294/82.33 X |
| 4,610,474 | 9/1986 | Jaatinen | 294/82.31 X |
| 4,765.667 | 8/1988 | Hamrin | 294/82.2 X |

Primary Examiner—David M. Mitchell
Assistant Examiner—Dean J. Kramer
Attorney, Agent, or Firm—Mark P. Stone

[57] ABSTRACT

A lifting hook comprising a suspension part (1) fitted with a suspension shaft (7) which supports a hook part (5) provided with a slot (6). A safety latch (11) is pivotally journalled in the hook part. In a raised position, the safety latch keeps the suspension shaft distanced from an upper end portion (32) of the slot by engaging contact surfaces (16, 17) of the suspension part. When the safety latch is swung down, the suspension shaft moves into said end portion, whereby the safety latch is locked. The hook part (5) can be arranged, when being lowered into contact with the load or another surface and thereupon lifted again, to perform a turning movement into an upside down position during which the safety latch is opened and the load is released. The turning movement is caused by a displacement of the suspension shaft (7) and the hook part (5) in relation to each other along the slot (6), which results in a displacement of the center of gravity of the hook part.

11 Claims, 8 Drawing Sheets

LIFTING HOOK WITH A SAFETY LATCH AND CAPABLE OF BEING PROVIDED WITH AUTOMATIC LOAD RELEASE FUNCTION

The present invention refers to a lifting hook fitted with a safety latch device which, when the hook is loaded by a load suspended from same, safely closes the hook opening and makes it impossible to open it. Furthermore, and preferably, it is possible to design the hook for an automatic opening of the safety latch and an automatic release of the load after the completion of a lifting operation, but it is also possible to design the hook only to function as a so-called safety hook, without the aforementioned automatic functions.

STATE OF THE ART

The U.S. Pat. No. 1,386,583 describes a lifting hook fitted with a suspension part and a hook part suspended from a shaft in the suspension part. The hook part is provided with a slot along which it can be displaced on the shaft. Through a displacement of its centre of gravity, the hook part can thereby be made to tip over from a load carrying to a load releasing position in which the hook part is turned upside down, so that a lifting chain or the like suspended from same falls out of the hook opening. This hook is very imperfect in the respect that it has no form of latch for the closing of the hook opening during the course of a lifting operation.

A further development of such a load releasing hook is described in the European patent application No. 86906486.5 (publication No. 0254724). This hook is fitted with a latch which, in one of the embodiments described by the Applicant, provides for a safe closing of the hook opening as long as the hook is loaded by a load suspended from same. A considerable disadvantage of this hook is, however, that the setting of same in its load receiving position requires instruction of the operator. An operator not familiar with the hook will not understand how to carry out the setting operation. This will create problems in a large number of cases, such as on large work sites where many persons may be involved in loading and unloading operations, etc., or in the case of cranes fitted on vehicles which carry out work operations in varying places where the mode of function of the hook is unknown. Another disadvantage of this type of hook is that, in order to provide for a displaceable journalling of its safety latch and the setting of the hook in its load receiving position, it is provided with slots, etc., which from the point of view of manufacture are complicated and cost increasing.

Another known type of hook than the load releasing hooks mentioned above are so-called safety hooks. In these hooks, the suspension part and the safety latch are made in one piece, the safety latch extending at an oblique angle from the substantially vertical suspension part. The hook part is pivotally journalled in the suspension part. When the hook is loaded, the safety latch and the hook part are locked relatively to each other in such a position that the hook opening is closed. For this locking, a special, movable locking member is provided which is released manually when the hook is to be opened. The locking member can be made to retain the hook in its open position when unloaded or slightly loaded, but to give way at a heavier load, so that the hook is automatically closed and locked.

A disadvantage of the aforementioned resilient retaining of the hook in its open position is that if, when being prepared for a lifting operation, the hook is to receive two or more heavy chains, it may close as soon as loaded by the first one of these, which makes the hook difficult to operate.

Another disadvantage is that the locking member which locks the hook in its closed position prevents a turning movement of the hook part relatively to the suspension part. If lifting chains or the like are not assuming an exactly correct middle position in the hook part, but the load is displaced towards the hook point, a prizing force is generated which loads the locking member. If the load is displaced in the opposite direction, a corresponding prizing force is generated between the hook point and the safety latch.

By being subjected to the abovementioned prizing forces, the locking member or its contact surfaces in the hook may be deformed, so that the locking member is difficult to move out of or into its locking position, and furthermore corrosion and penetrating impurities may cause the same difficulty.

SUMMARY OF THE INVENTION

The object of the present invention is to provide a lifting hook of the kind referred to in the foregoing, in which are eliminated the aforementioned disadvantages of the known art.

Consequently, the hook in accordance with the present invention is so designed that—for a hook of the automatically load releasing type—no particular knowledge is required in order to set the hook in a load receiving position.

Furthermore, the hook in accordance with the present invention is so made that a turning movement of the hook part relatively to the suspension part is possible when the hook is loaded, without any prizing forces affecting the safety latch or any other parts of the hook.

Still further, an automatically load releasing hook in accordance with the present invention does not show the disadvantages in the form of price increasing design features necessary to obtain the required latch function and setting of the hook in its load receiving position which have been described in the foregoing.

Finally, in accordance with the present invention a socalled safety hook of a not automatically load releasing type can be obtained, in which no special, movable and manually operated locking member of the type described in the foregoing is required, the operation of which may be made difficult through damages, corrosion or the like on same. Neither is there, in this type of hook in accordance with the present invention, any risk of unintentional closing and locking of the hook during the insertion of lifting chains or the like.

These improvements and advantages have been achieved with the hook in accordance with the present invention such as it is defined in the Claims.

SHORT DESCRIPTION OF THE DRAWINGS

The invention will be described closer below with the help of examples of embodiments and with reference to the accompanying drawings, which show:

FIG. 2, a side view of the lifting hook in accordance with FIG. 1 with the safety latch in the open position and ready to receive a strap or the like.

FIG. 8, a side view of a lifting hook in accordance with the invention of a not automatically load releasing type, with the safety latch in the open position and ready to receive a strap or the like.

DETAILED DESCRIPTION OF A FIRST EMBODIMENT OF THE INVENTION

Figure 6:
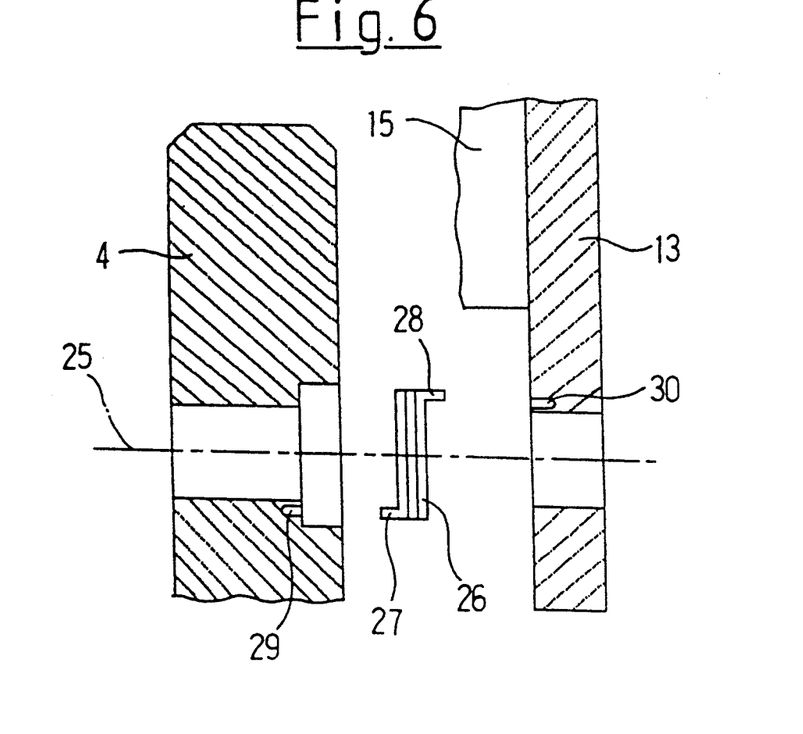
FIG. 6, a sectioned end view showing details of the safety latch and one end portion of a hook in accordance with the present invention, with a spring arranged in said parts.
Figure 7:
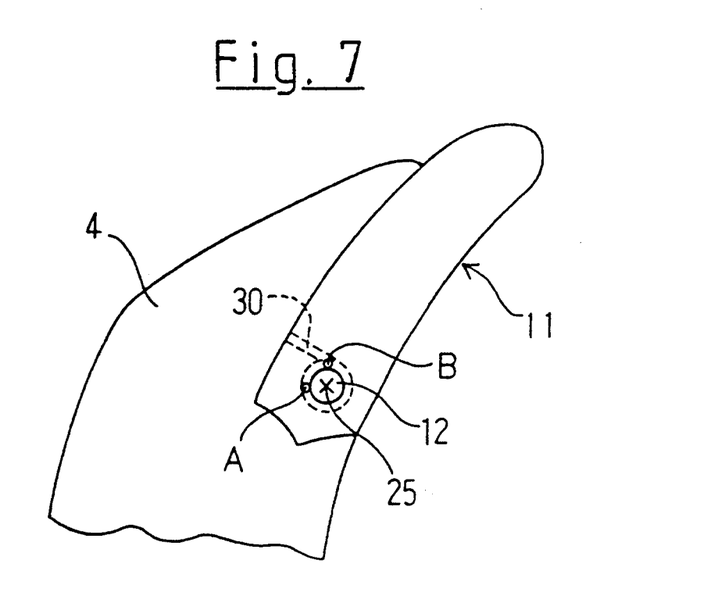
FIG. 7, a side view of the details in accordance with FIG. 6.
Figure 8:
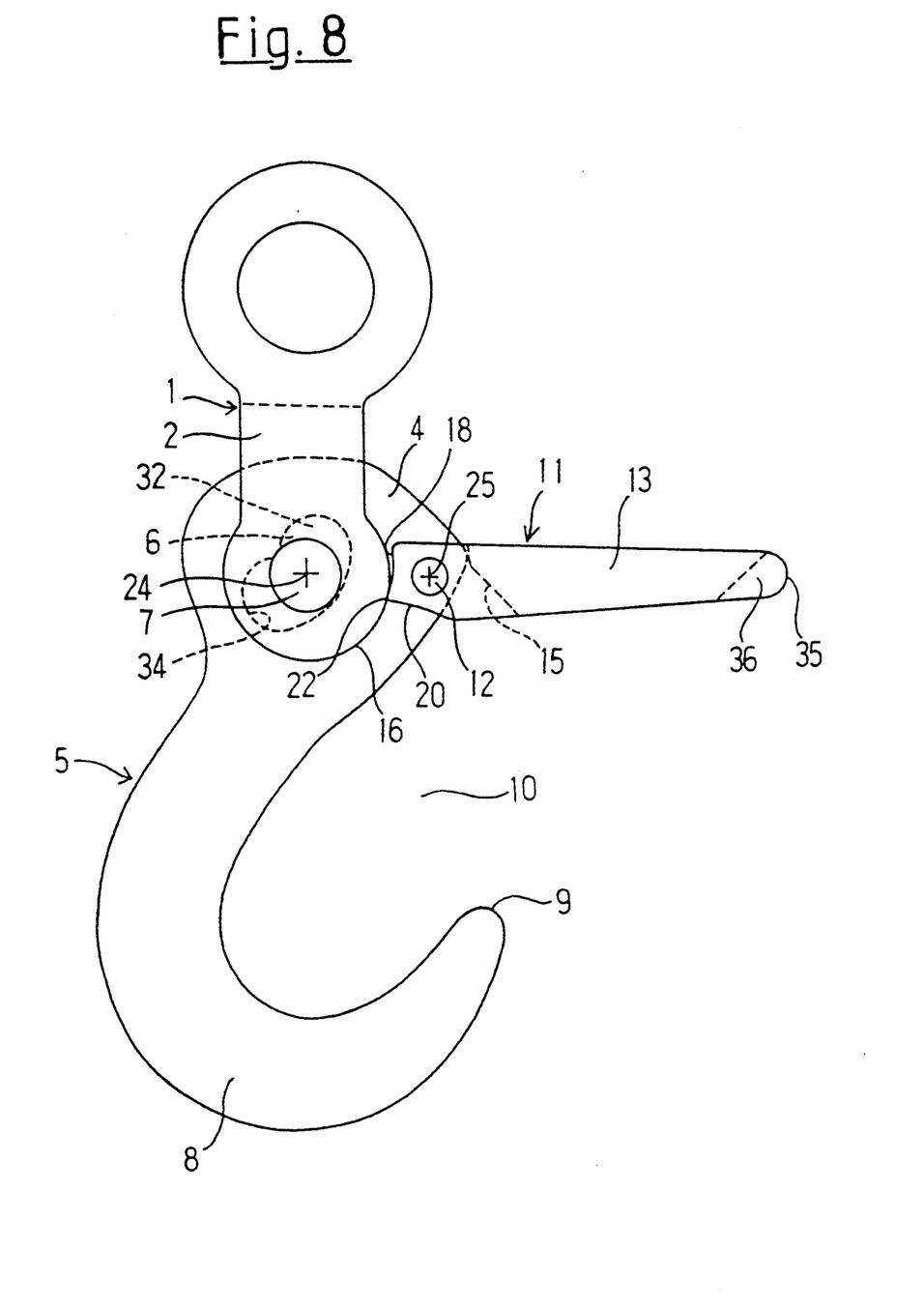
Figure 9:
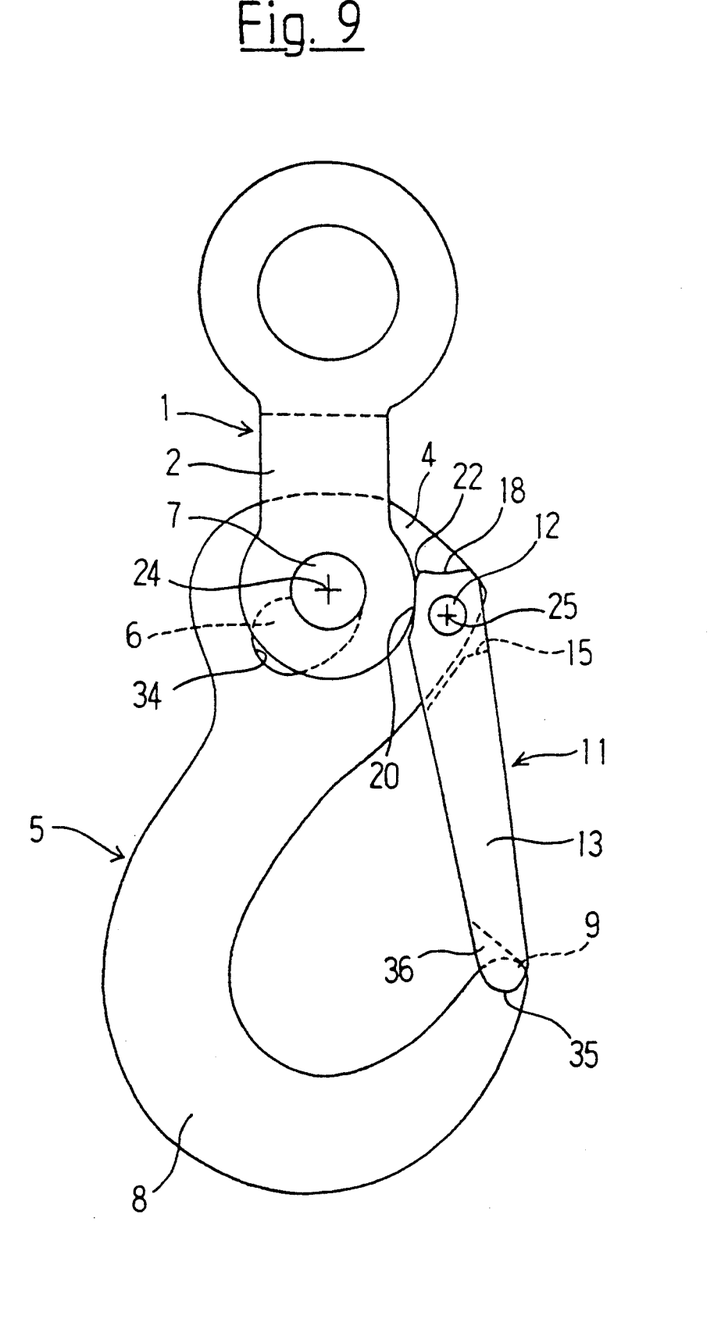
FIG. 9, a side view of the hook in accordance with FIG. 8, with a strap hooked on to it and the safety latch closed and locked.

This description refers to the embodiment shown from FIGS. 1-7 but is valid, in applicable parts, also for the embodiment in accordance with FIGS. 8-9 with the exceptions and additions which are evident from the following separate description of said latter embodiment.

In the drawings, the numeral 1 designates the suspension part of the lifting hook. Said part is formed with two forked portions 2, 3 protruding downwards, between which a suspension portion 4 of a hook part 5 is inserted. The hook part 5 is formed with an elongated slot 6 and is supported by a suspension shaft 7 which is passed through the slot and the two forked parts 2, 3. The hook part extends, in a curved form, from the suspension portion 4 to a hooking portion 8 with a free hook point 9, said portions fdefining between them an opening 10.

In the suspension portion 4 of the hook part, a safety latch 11 is journalled on a shaft 12. The safety latch is formed with two forked portions 13, 14 which are passed over two opposite sides of the suspension portion 4. The insides of the forked parts are terminated by a connecting surface 15 which can also serve as a stop against the suspension portion when the safety latch is swung up into a position freeing the opening 10.

The forked parts 2, 3 of the suspension part 1 are formed with arced contact surfaces 16, 17 which face end surfaces 18, 19 and 20, 21, respectively, on the safety latch and which are concentric with the centre 24 of the suspension shaft. The surfaces 20, 21 engage the contact surfaces at a shorter distance from the centre 25 of the safety latch shaft than is the case with the surfaces 18, 19. The latter are connected with the surfaces 20, 21 via edge or corner portions 22, 23.

The safety latch can, in accordance with FIGS. 6 and 7, be fitted with a spring 26 which is concentric with the shaft centre 25 of the safety latch and is inserted into a recess in the suspension portion 4 of the hook part, inside one of the forked portions 13, 14 of the safety latch. The spring is provided with protruding studs 27, 28 which engage a hole 29 in the hook part and a slot 30 on the inner side of the forked portion. The spring is locked in its position by the stud 27, and during the fitting of the safety latch the slot 30 is passed over the opposite stud 28, turning the stud from a position A in which the spring is slack, to a position B in which it is pretensioned. The spring will now strive to keep the safety latch in its open position in accordance with FIG. 2. The spring force should be so adjusted that it can easily be overcome for the lowering of the safety latch.

The end surfaces 18, 19 of the safety latch should suitably be so located that, when engaging the contact faces 16, 17 (FIG. 2), their lowest edges or corners 22, 23 are below a straight line drawn between the centre 24 of the suspension shaft and the centre 25 of the safety shaft, whereby a retaining force is obtained which is generated by the weight of the hook part 5. The turning force of the spring 26 described above can thereby be reduced, and it is also possible to leave out the spring entirely.

Figure 1:
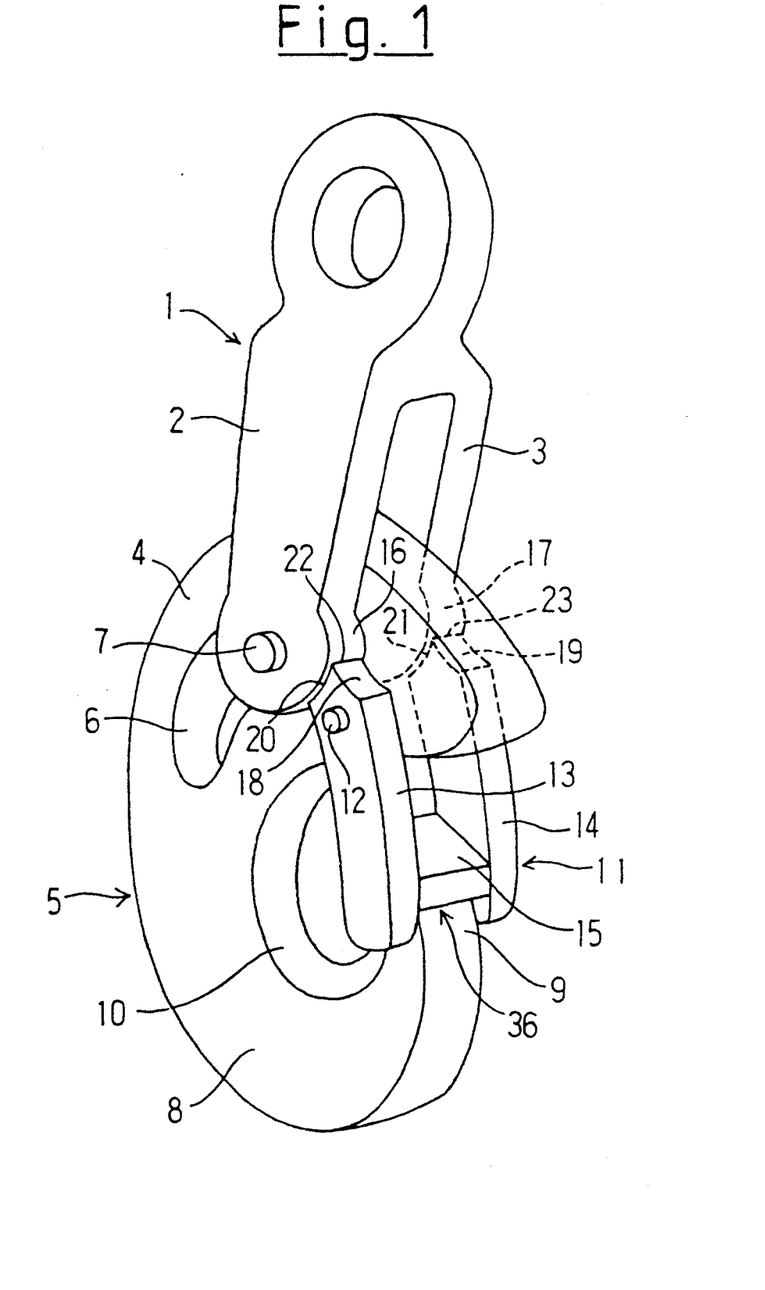
FIG. 1, a perspective view of a lifting hook in accordance with the invention of the automatically load releasing type, without a connected load and with the safety latch in the closed position.
Figure 2:
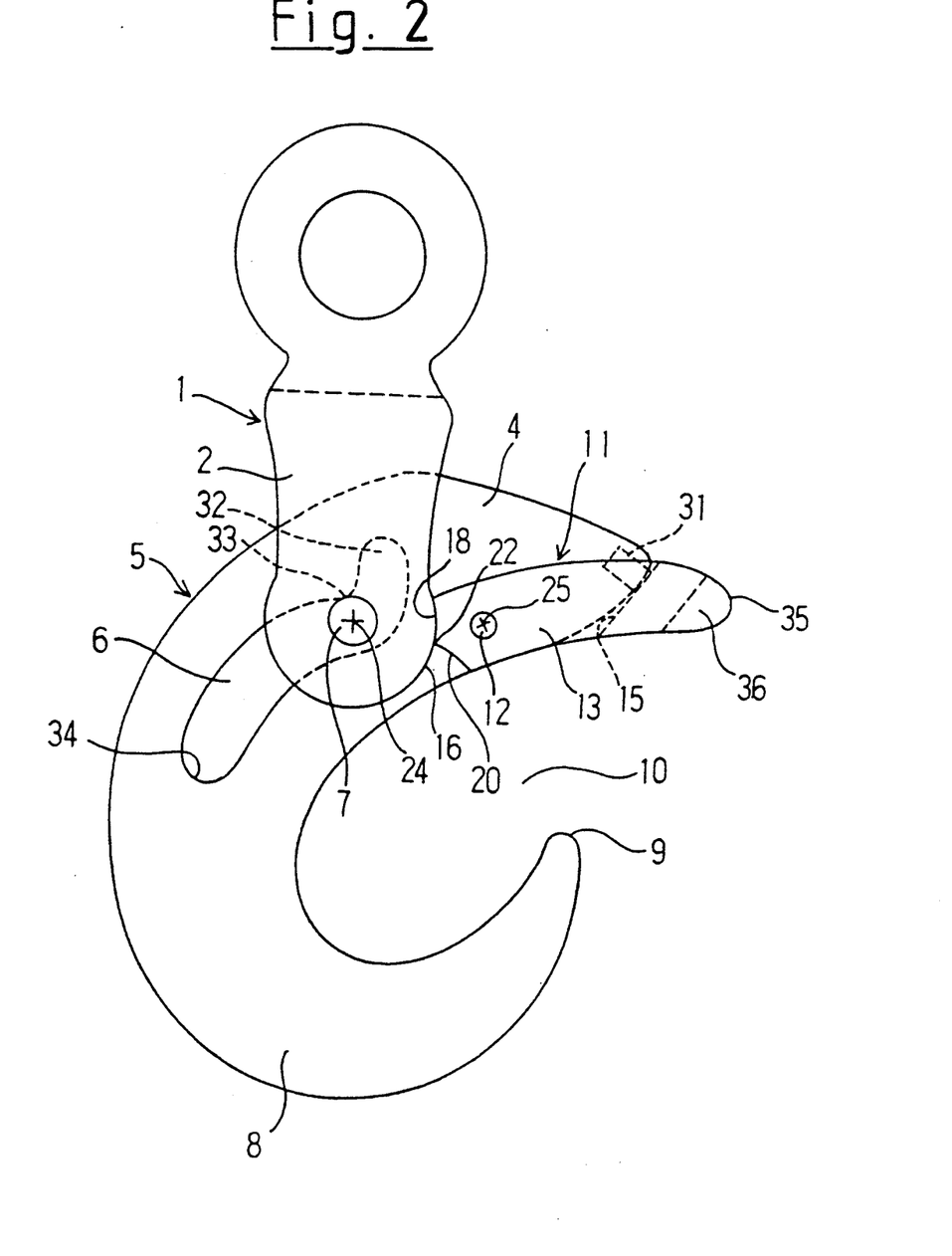

However, in an automatically load releasing lifting hook in accordance with FIGS. 1-5 it is advantageous—as shall be described further herebelow—to provide for the safety latch, after it has been opened, to remain in its open position even before it has been brought to engage the contact surfaces 16, 17. As an alternative to the abovementioned spring 26 it is also, to obtain this effect, possible—as indicated in FIG. 2—to arrange a permanent magnet 31 in the suspension portion 4 of the hook part, which magnet contacts the surface 15 of the safety latch when the latch is opened.

The suspension shaft 7 is displaceable in the slot 6 of the hook part. The slot is, at its upper end, terminated by a journalling portion 32 for the shaft, which portion is more steeply inclined than the other portions of the slot. At the entrance to the journalling portion, the slot is formed with a transition surface 33. From its upper end, the slot extends so far downwards in the hook part 5 that, when the suspension shaft 7 is displaced towards the lower end of the slot, through a displacement of its centre of gravity the hook part will tip over, so that the suspension shaft engages the lower end surface 34 of the slot and the hook part is hanging upside down.

When the lifting hook is in its load receiving position in accordance with FIG. 2, the safety latch 11 is in its open position and one or more straps or the like can be inserted through the opening 10. The end surfaces 18, 19 of the safety latch are in engagement with the contact surfaces 16, 17 of the suspension part, at such a distance from the centre of the safety latch shaft that the suspension shaft 7 engages the transition surface 33 of the hook part. Through its own weight, the hook part strives to move into the journalling portion 32 of the slot, but is prevented from doing so by the safety latch. Hereby, due to the arrangement of the end surfaces of the safety latch described above, a retaining force is generated on the safety latch in the position it has assumed. As described above, the safety latch can, in addition, be provided with auxiliary means to this effect, in the form of the spring 26 or the magnet 31.

When the load has been connected, the safety latch 11 is lowered manually. During the initial stage of the lowering movement, until the corner surfaces 22, 23 have crossed a straight line between the centre 24 of the suspension shaft and the centre 25 of the safety latch shaft, a short displacement of the hook part and suspension shaft relatively to each other occurs, in a direction away from the journalling portion 32 of the slot. During the next stage of the lowering movement, the distance of engagement from the centre 25 of the safety latch shaft to the contact surfaces 16, 17 is reduced, whereby, by its own weight, the hook part is displaced so that with the journalling portion 32 of the slot it rests on the suspension shaft 7.

Figure 3:
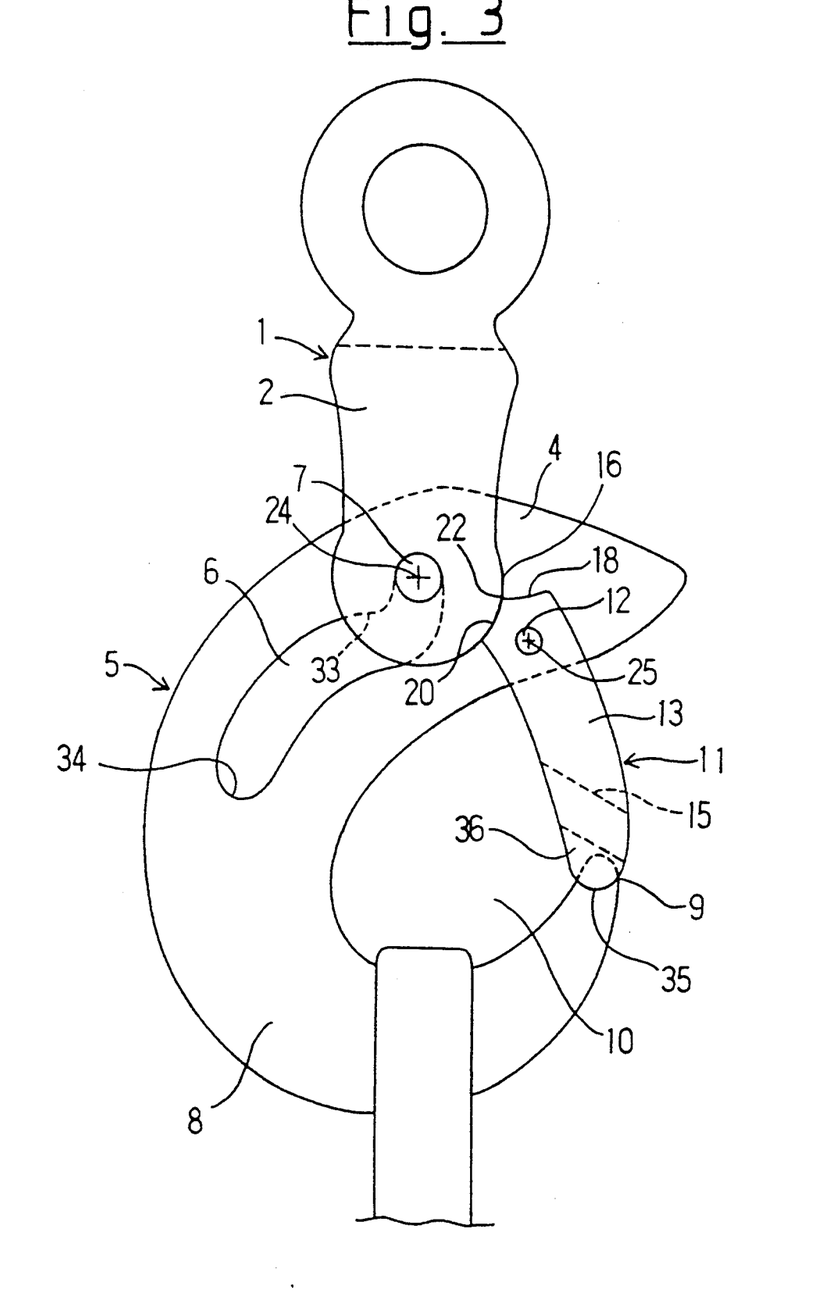
FIG. 3, a side view of the lifting hook in accordance with FIG. 2 with a strap hooked on to it and the safety latch closed and locked.

In this position, which is shown from FIG. 3, the end surfaces 20, 21 of the safety latch engage the contact surfaces 16, 17 of the suspension part, and a recessed portion 36 of the free end 35 of the safety latch encloses the hook point 9. As the corners 22, 23 of the end surfaces of the safety latch are now above a straight line drawn between the centre 24 of the suspension shaft and the centre 25 of the safety latch shaft, and as the weight of the hook part in combination with the steep incline of the surface of the journalling portion 32 which adjoins the transition surface 33 makes it impossible to force the suspension shaft out of its position, the safety latch is completely locked in its closed position and cannot be turned. When a lifting operation is commenced, the weight of the load is added as a further safety factor.

As stated above, in the position in accordance with FIG. 3, the corners 22, 23 of the end surfaces of the safety latch are above a straight line drawn between the centre 24 of the suspension shaft and the centre 25 of the safety latch shaft. This line should preferably be inclined downwards from the firstmentioned to the lastmentioned shaft centre, i.e. the centre 25 of the safety latch shaft should be lower than the centre 24 of the suspension shaft. This in order that a pressure of the corner surfaces 22, 23 of the safety latch against the contact surfaces 16, 17 of the suspension part shall act in such a direction that the hook part 5 does not tend to be lifted out of the position in which the journalling portion 32 of its slot is resting on the suspension shaft 7.

A great advantage of the embodiment in accordance with the invention is that the hook part 5, in order to adjust in relation to the distribution of the weight of the load along its load-supporting surfaces, can turn relatively to the suspension part 1 with no prizing forces being generated on the safety latch or any other parts. Since the contact surfaces 16, 17 of the suspension part are concentric with the suspension shaft 7, a turning movement of the contact surfaces does not, apart from a small amount of friction, cause any change in their engagement with the end surfaces of the safety latch. It should be noted that the safety latch and said contact surfaces do not exert pressure against each other when the safety latch is in its closed position, but are only in light contact or separated by a play of a fraction of a millimeter. Only in case an opening force acts on the safety latch will it exert pressure against the contact surfaces, and be prevented by these to perform an opening movement.

As stated, the safety latch 11 is thus safely locked during a lifting operation. This locking effect remains, even if the load is set down, so this can be done without risk one or more times in order to position the load properly or to adjust straps or the like. The safety latch is released only when the load has ben finally set down in its place and the lifting hook is lowered a further distance, until it contacts the load or another surface.

Figure 4:
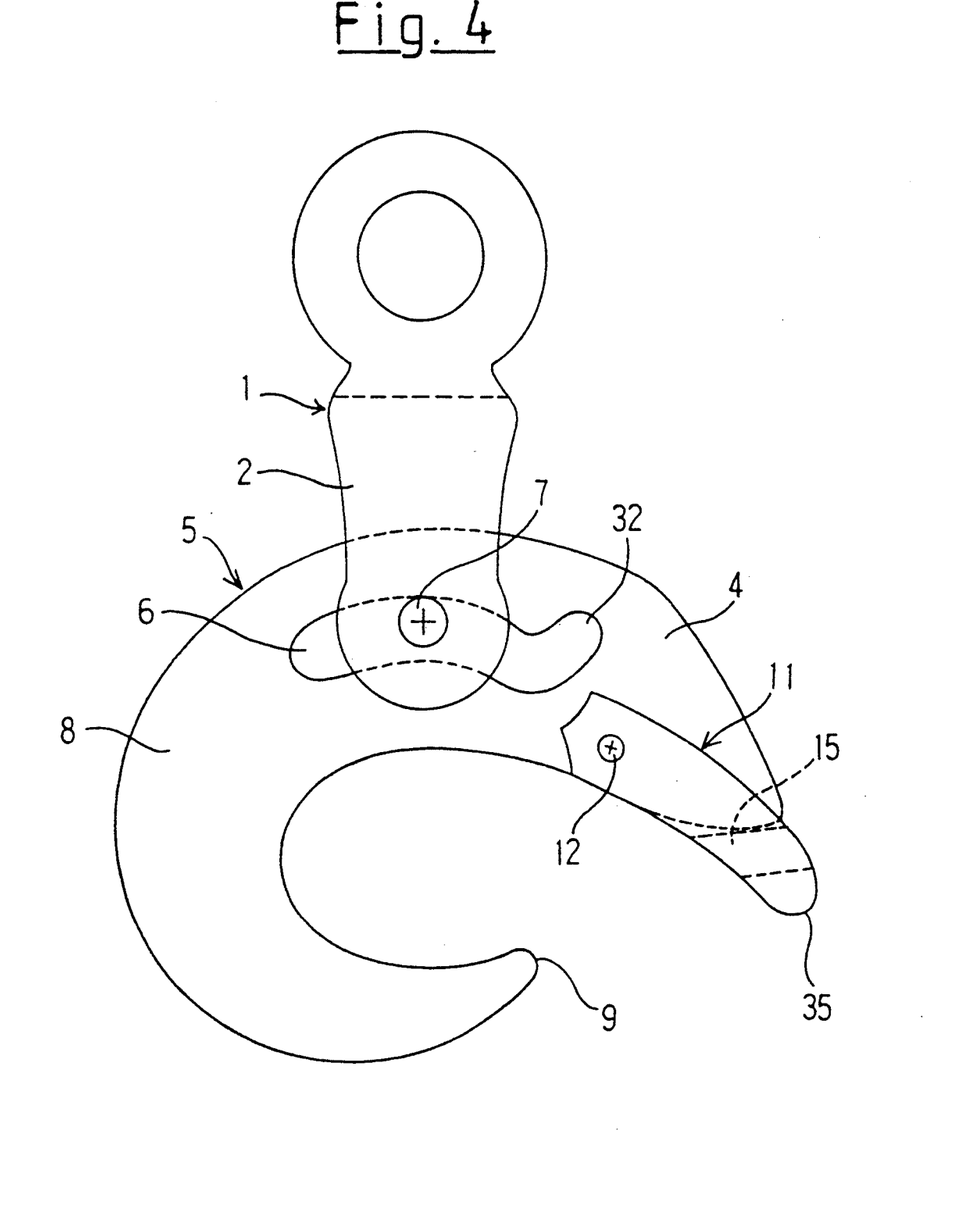
FIG. 4, a side view of the same hook as above during a first stage of a turning movement for automatic load release.

In a manner already known, this is done in such a way that, when the hook part 5 contacts the surface and cannot be lowered a further distance, while the suspension part 1 continues to be lowered, the hook part will tip over as shown from FIG. 4, and the suspension shaft 7 moves out of the journalling portion 32 of the slot and is displaced in a direction towards the opposite end of the slot. When the suspension part is thereupon lifted again, the hook part will turn a further amount, so that the suspension shaft 7 will engage the end surface 34 of the slot and the hook part 5 is upside down. Inserted lifting straps or the like will thereby fall out of the hook. The safety latch 11 is released as soon as the suspension shaft 7 has left the journalling portion 32 of the slot and will, by its own weight or by being additionally affected by the spring 26, hang substantially vertically when the lifting hook assumes the position shown from FIG. 5.

Figure 5:
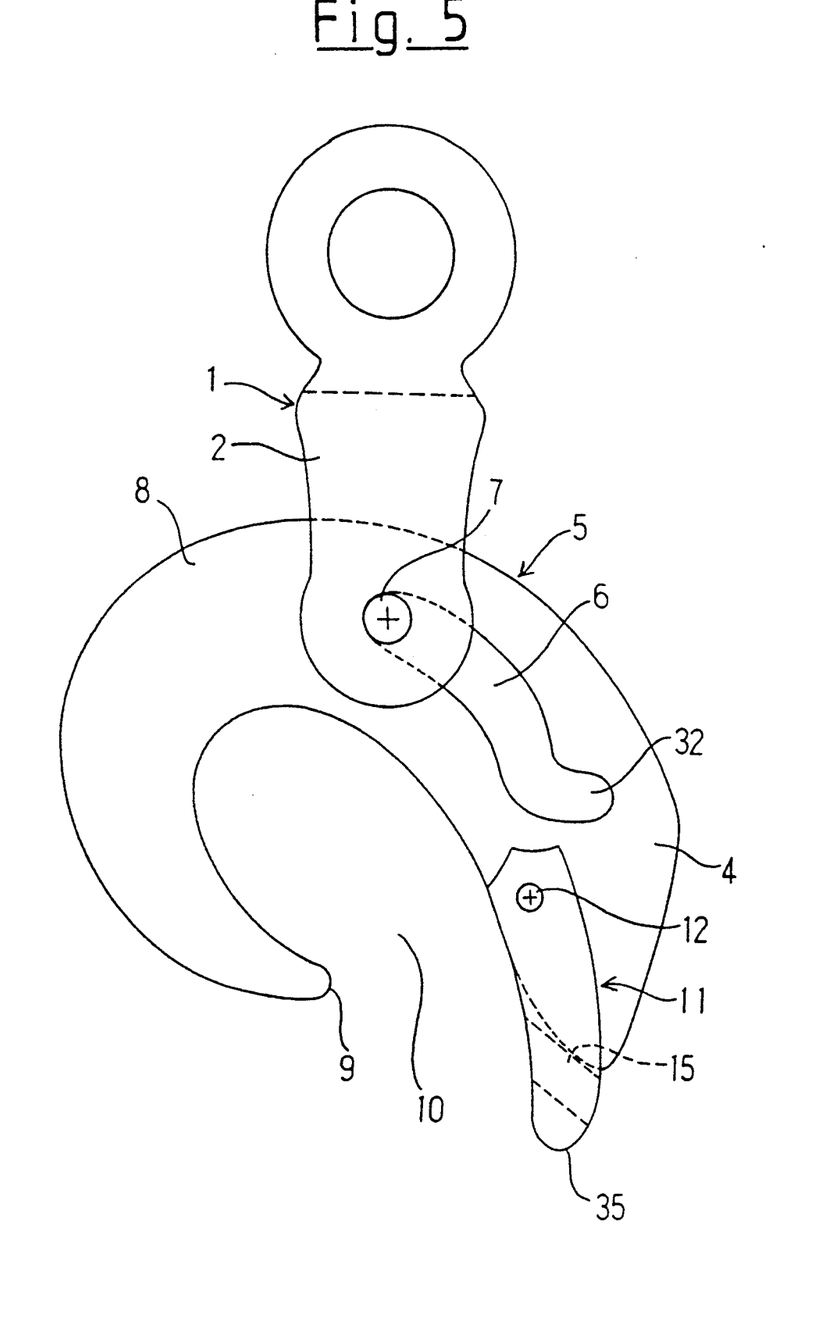
FIG. 5, a side view of the lifting hook in accordance with FIG. 4 after the completion of the turning movement and, consequently, with the load released.

In order to reset the hook in the position in which it is prepared for receiving a load, it is only required, by one single movement, to grip around the suspension portion 4 of the hook part and the safety latch 11, holding the latter pointing outwards from the end of the portion 4 as shown from FIG. 5, and swing the hook part back into position in accordance with FIG. 2. The only thing which the operator needs to understand is that he should hold the safety latch in its open position, which is a self-evident prerequisite for the insertion of straps or the like. However, to make this still more natural the lifting hook can, as described in the foregoing, be provided with a device which retains the safety latch in its open position even if the hook part 5 is not hanging upside down, i.e. with a spring 26 or a magnet 31. Should the operator, by mistake, lower the safety latch before a load has been connected, he can raise it again by lifting the hook part 5 a centimetre or two, so that the suspension shaft 7 is displaced a short distance in the slot 6 and the safety latch is released.

As evident from the above description, the safety latch 11 is provided with a totally uncomplicated bearing in the form of a shaft 12 which, as an additional advantage, can be amply dimensioned in order to absorb heavy loads. Furthermore, as has also been shown, the lifting hook is very simple to reset from a load releasing to a load receiving position. Consequently, no parts which from the point of view of manufacture are costly and complicated are needed in the same way as in the lifting hook in accordance with the European patent application discussed above.

DETAILED DESCRIPTION OF A SECOND EMBODIMENT OF THE INVENTION

The embodiment shown from FIGS. 8 and 9 differs from that described in the foregoing mainly only in that the slot 6 in the hook part 5 is shorter, and that the hook part is somewhat differently shaped, since in this case its different portions do not need to have such a distribution of weight that the hook part is turned around at a certain amount of displacement of its centre of gravity.

A lifting hook of this type, the hook part 5 of which is cheaper to manufacture than the corresponding part of the first embodiment described, can to an advantage be used to ensure safe lifting operations in cases when an automatic load release is not required or suitable. The latter can for example be the case if the place where the load is to be deposited is not in the crane operator's line of vision so that he cannot, without assistance, handle the depositing of the load in the exactly right spot and the releasing of the hook at the right moment, or if the load is hooked on in such a way that the hook cannot be freed from it automatically but must be freed manually.

The lifting hook is changed from a load receiving position in accordance with FIG. 8 to a load supporting position in accordance with FIG. 9 by means of a lowering of the safety latch manually, whereby the latter is locked in the manner described earlier. To open the hook again after a completed lifting operation, it is not necessary to lower it until it contacts the load. The operator of the hook only needs, after the load has been set down so that the strap or the like is unloaded, to lift the hook part 5 with one hand, so that the suspension shaft 7 leaves its uppermost position in the slot 6, and with his other hand raise the safety latch 11. If the safety latch is fitted with the spring 26 described earlier, it does not need to be raised manually but will turn by itself. The strap or the like can now be removed, and the hook is ready for a new lifting operation.

As in the case of the embodiment described earlier, this lifting hook, too, is so made that, when the hook is loaded, the hook part 5 and the suspension part 1 can turn in relation to each other in order to adjust to the distribution of load along the load supporting surfaces of the hook part; this without any prizing force acting on either the safety latch or other parts. This is a considerable advantage in comparison with the so-called safety hooks of the known type which have been described in the foregoing.

Another considerable advantage is that, to lock and release the safety latch, no special locking member is required of the type common in the so-called safety hooks, which member may, from various causes, seize or jam and be difficult to operate, but as described above releasing is done simply by the operator's lifting the hook part 5.

Finally, the hook opening cannot, as is the case with the aforementioned safety hooks, be unintentionally closed through a spring-loaded locking member giving way when a heavy lifting chain or the like is inserted into the hook. On the contrary, such a load will in the case of the lifting hook in accordance with the present invention have an additional retaining effect on the safety latch 11 when the latter is in its raised position.

I claim:

1. A lifting hook comprising a suspension part (1) which can be suspended from a traction element, a curved hook part (5) supported by a suspension shaft (7) fitted in said suspension part and extending from a suspension portion (4) to a free hook point (9), therebetween forming an opening (10) for the reception of a lifting means, and provided with a slot (6) receiving said suspension shaft which is displaceable in the slot; and a safety latch (11) which is journalled in the hook part by means of a second shaft (12), the slot (6) being inclined, when the hook is in a load receiving position, so that its one end which faces in a main direction outwards from the opening (10) is located higher than its opposite end, the hook part (5) and suspension part (1) being rotatable relatively to each other around a centre (24) of the suspension shaft, and the safety latch (11) being rotatable around a centre (25) of the second shaft between a position blocking the opening (10) and a position freeing said opening, characterized in that the suspension part (1) is provided with at least one arced contact surface (16, 17) which is concentric with the centre (24) of said suspension shaft and which faces the safety latch (11), that the second shaft (12) is fixedly arranged in the radial direction and that the safety latch is provided, with at least one end surface (20, 21) intended to engage the contact surface (16, 17) when the safety latch is in said blocking position and, connecting with and extending at an angle to the first end surface, at least one second end surface (18, 19) intended to engage the contact surface (16, 17) when the safety latch is in said freeing position, the first end surface (20, 21) being so located in relation to the centre (25) of the second shaft that when engaging the contact surface (16, 17) it permits a displacement of the suspension shaft (7) to said higher end of the slot (6), and the second end surface (18, 19) being so located in relation to the second shaft centre (25) that when engaging the contact surface it causes a displacement of the suspension shaft (7) in a direction away from the higher end of the slot (6), the first end surface (20, 21) being arranged, when engaging said contact surface, to extend with a highest edge surface (22, 23) above a straight line drawn from the suspension shaft centre (24) and the centre (25) of the second shaft, whereby a rotation of the safety latch in a direction freeing the opening (10) is prevented when the hook part (5) is loaded by a load suspended from the same.

2. A lifting hook in accordance with claim 1, characterized in that a spring (26) is provided in the hook part (5) to urge the safety latch (11) in a direction freeing the opening (10).

3. A lifting hook in accordance with claim 2, characterized in that the at least one second end surface (18, 19) is arranged, when engaging the corresponding contact surface (16, 17), to extend with a lowest edge (22, 23) below said straight line, whereby a retaining force generated by the weight of the hook part (5) is obtained to retain the safety latch (11) in the position freeing the opening (10).

4. A lifting hook in accordance with claim 2, characterized in that the centre (25) of the second shaft is arranged, when the hook is in a load carrying position, to be located lower than the centre (24) of the suspension shaft.

5. A lifting hook in accordance with claim 3, characterized in that the centre (25) of the second shaft is arranged, when the hook is in a load carrying position, to be located lower than the centre (24) of the suspension shaft.

6. A lifting hook in accordance with claim 1, characterized in that a permanent magnet (31) is provided in the hook part (5) to contact the safety latch (11) when the latter is in said freeing position, and that the safety latch is made of a material which is attracted by said magnet.

7. A lifting hook in accordance with claim 1, characterized in that the at least one second end surface (18, 19) is arranged, when engaging the corresponding contact surface (16, 17), to extend with a lowest edge (22, 23) below said straight line, whereby a retaining force generated by the weight of the hook part (5) is obtained to retain the safety latch (11) in the position freeing the opening (10).

8. A lifting hook in accordance with claim 7, characterized in that the centre (25) of the second shaft is arranged, when the hook is in a load carrying position, to be located lower than the centre (24) of the suspension shaft.

9. A lifting hook in accordance with claim 1, characterized in that the centre (25) of the second shaft is arranged, when the hook is in a load carrying position, to be located lower than the centre (24) of the suspension shaft.

10. A lifting hook in accordance with claim 1 wherein said traction element comprises a wire.

11. A lifting hook in accordance with claim 1 wherein said lifting means comprises a strap.

* * * * *